Feb. 28, 1956     D. DAVIDSON     2,736,145

MACHINE FOR REMOVING FLASH FROM MOLDED RUBBER RINGS

Filed Oct. 25, 1954

DEWEY DAVIDSON,
INVENTOR.

BY
Hazard & Miller
ATTORNEYS

United States Patent Office 2,736,145
Patented Feb. 28, 1956

2,736,145

MACHINE FOR REMOVING FLASH FROM MOLDED RUBBER RINGS

Dewey Davidson, Santa Ana, Calif., assignor to Reeves Rubber, Inc., San Clemente, Calif., a corporation of California Application October 25, 1954, Serial No. 464,515

9 Claims. (Cl. 51—89)

This invention relates to a machine for removing flash from molded rubber rings.

Explanatory of the present invention, a large number of rubber rings are being manufactured for use as gaskets, seals, packings and the like. These rings are usually, but not necessarily, circular in plan and circular in cross section when in their normal or unstressed condition. In the course of their manufacture rubber stock, either natural or synthetic, is placed in a mold and cured with the result that there usually is a flash present on the interior and exterior of the ring occasioned by a portion of the rubber stock being forced into the parting plane between the two halves of the mold. This flash which is in the nature of a thin rubber fin extending along the length of the ring must be removed.

The practice in removing the inside and outside flash on such rings heretofore has been to manually pass the ring lengthwise relatively to a rotating abrasive wheel to abrade off the flash. First, the ring is positioned over the abrasive wheel to grind off the flash on the interior of the ring and then the ring is moved lengthwise relatively to the abrasive wheel with its exterior flash in contact therewith.

A primary object of the present invention is to provide a machine which will automatically and simultaneously remove both the interior and exterior flash thereby saving considerable time and labor involved in removing these flashes.

With the foregoing and other objects in view, which will be made manifest in the following detailed description and specifically pointed out in the appended claims, reference is had to the accompanying drawings for an illustrative embodiment of the invention, wherein:

Figure 1:
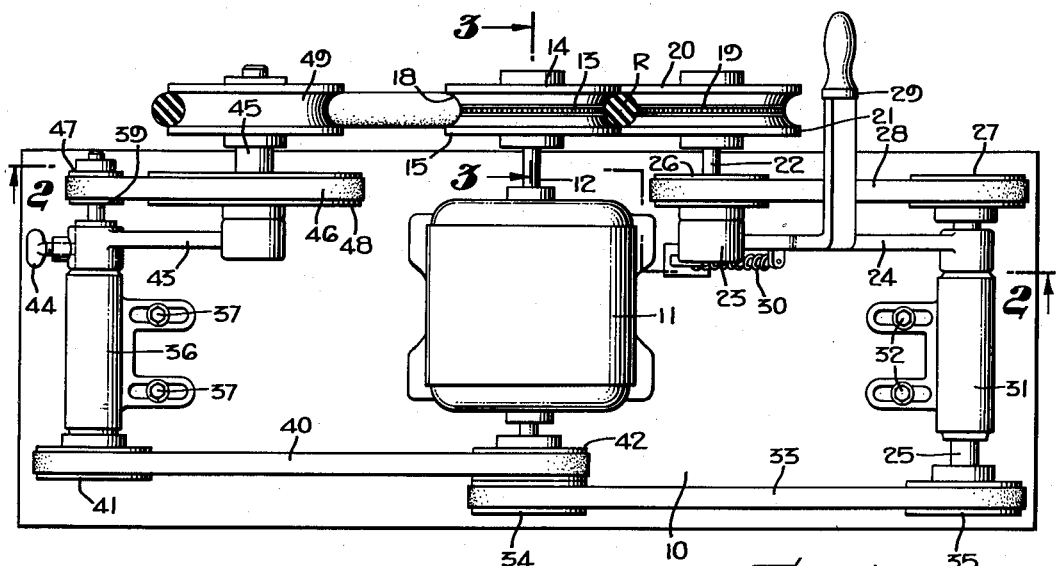
Figure 1 is a top plan view of a machine embodying the present invention, the ring whose flash is being removed thereby being shown in horizontal section.

Referring to the accompanying drawings wherein similar reference characters designate similar parts throughout, the improved machine consists of a suitable base 10 on which an electric motor 11 is mounted. The end of the rotor shaft of the motor 11 is indicated at 12 and on this rotor shaft there is keyed or otherwise fixed a flash removing means 13. This flash removing means may be in the nature of a circular saw having peripheral teeth or in the alternative, it may be in the form of an abrasive disc. In either form, the thickness of the flash removing means is somewhat greater than the thickness of the usual flash encountered on the rings whose flashings are to be removed.

On each side of the flash-removing means 13 there are half pulleys 14 and 15 which are mounted on the rotor shaft 12, such as by anti-friction bearings 16 and 17, respectively. In this manner, these pulley halves are rotatable about axes coincident with the axis of rotation of the flash-removing means 13 and relatively thereto. Their peripheries are so shaped as to cooperate to partially receive the ring R whose flash is to be removed. In other words, the halves cooperate to form a groove 18 which partially receives the ring R. The depth of the groove 18 is such that the teeth on the flash-removing means or the grits on the periphery thereof, in the event that an abrasive disc is used, are capable of removing the flash just to a point which will be flush with the cross-sectional circular configuration of the ring.

In opposition to the flash-removing means 13 there is a similar flash-removing means 19 arranged in planar alignment therewith. This flash-removing means is likewise flanked by pulley halves 20 and 21 which are of similar configuration to the pulley halves 14 and 15, and are arranged in alignment therewith. The flash-removing means 19 is keyed or otherwise fixed on a shaft 22, whereas the pulley halves 20 and 21 are mounted on the shaft by means of anti-friction bearings similar to the bearings 16 and 17 so that these pulley halves are rotatable about axes coincident with the axis of rotation of the flash-removing means 19 and relatively thereto. The shaft 22 which is parallel to the rotor shaft 12 is rotatable in a journal or bearing 23 that is mounted on an arm 24 which, in turn, is rotatably mounted on a shaft 25. A pulley 26 is on the shaft 22 and a pulley 27 is on the shaft 25. These pulleys are connected by an endless belt 28 so that in all positions assumed by the arm 24, the belt 28 will remain constantly tight and provide a driving connection between the shaft 25 and the shaft 22. The arm 24 can be swung manually by means of a handle 29, but is urged into a position wherein its pulley halves 21 and 22 are in engagement with the pulley halves 14 and 15 by means of a tension spring 30 which connects the arm 24 to the base 10. The shaft 25 is rotatably mounted in a journal or bearing 31 that is adjustably mounted on the base 10, such as by cap screws 32 extending through slots therein. The shaft 25 is driven off of the motor 11 by means of an endless belt 33 trained over a pulley 34 on the rotor shaft of the motor and over a pulley 35 on the shaft 25. By means of this drive it will be noted that the two shafts 12 and 22 are driven in the same direction and as the pulleys are of equal size, the speed of rotation of the flash-removing means 19 is the same as that of the flash-removing means 13. This equal speed of rotation, however, is not essential to the present invention.

On the other end of the base there is a journal or bearing 36 that is adjustably mounted on the base, such as by cap screws 37. This journal or bearing serves to rotatably support a shaft 39 which is likewise driven by the motor 11 by means of an endless belt 40 trained over the pulleys 41 and 42.

Figure 2:
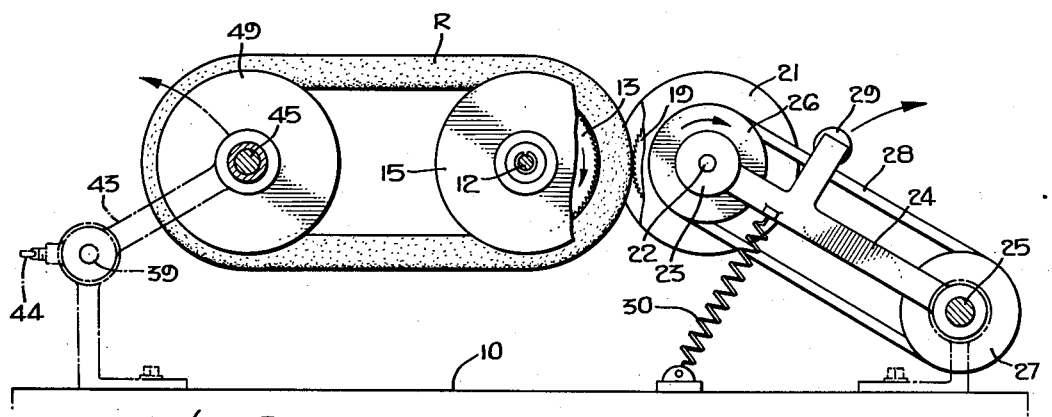
Fig. 2 is a vertical section taken substantially upon the line 2—2 upon Fig. 1.
Figures 3, 4:
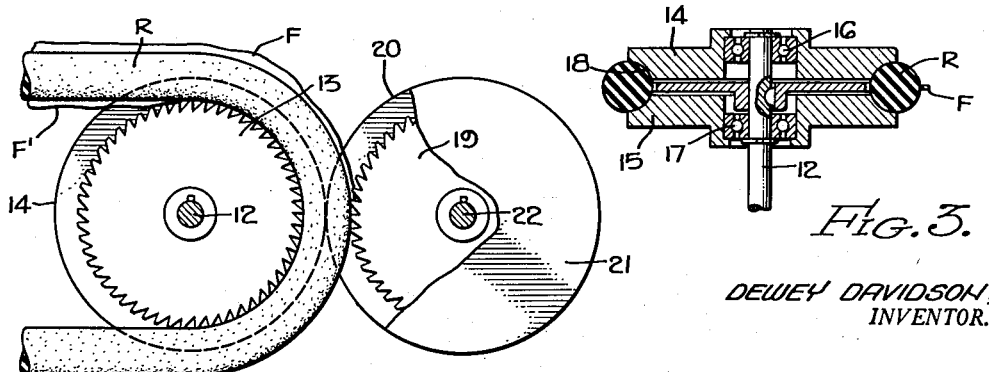
Fig. 3 is a sectional view taken substantially upon the line 3—3 upon Fig. 1.
Fig. 4 is a partial view in section illustrating the manner in which the flash is removed from the interior and exterior of the ring.

On the journal 36 there is rotatably adjustable an arm 43 that can be held in any adjusted position by means of a set screw 44. The arm 43 rotatably supports a shaft 45 and an endless belt 46 provides a driving connection between the shaft 39 and the shaft 45 by being trained over pulleys 47 and 48 thereon. The pulley 48 is preferably materially larger than the pulley 47 so that the shaft 45 rotates at approximately one-quarter the speed of the rotor shaft 12. On the shaft 45 there is a pulley 49 over which the rubber ring R can be positioned, and from which the rubber ring R may be stretched into an ovate condition as illustrated in Fig. 2 in training it over the pulley halves 14 and 15.

The operation of the above-described construction is substantially as follows:

The rubber ring R which has the flash F and F' is positioned against the pulley halves 14 and 15 and is stretched into its ovate condition in which it can be positioned over the pulley 49. To facilitate the application of the ring R to the pulley halves 14 and 15, the arm 24 is swung upwardly and away from the motor 11 by means of the handle 29. This swinging movement is accomplished against the tension of the spring 30. When the rubber ring has been positioned the handle 29 is released and the spring 30 is effective to swing the arm 24 downwardly until the pulley halves 20 and 21 engage the exterior of the ring. The motor 11 is then started which causes both flash-removing means 13 and 19 to be rotated rather rapidly and in opposite directions. At the same time the pulley 49 will be power-driven by the motor to cause the ring to move. As the ring moves longitudinally it merely passes about the pulley halves 14 and 15 as these pulley halves rotate on the rotor shaft 12 and relatively thereto. Also, the pulley halves 20 and 21 merely roll against the exterior of the ring as the ring moves. As the ring moves between the opposed sets of pulley halves, the flash F and F' will be brought into engagement with the peripheries of the two flash-removing means 13 and 19, respectively. These rapidly rotating means cause the flash F and F' to be cut or abraded off of the exterior and the interior of the ring. Linear speed at which the ring R moves is preferably about one-fourth of the peripheral speed of the two flash-removing means, although this relative speed may be varied under different conditions. Usually but a single complete revolution of the ring R about the pulley halves 14 and 15 is necessary to remove both flash F and F'. When this revolution is completed the arm 24 is swung upwardly by means of the handle 29 and the ring R is removed and replaced by another whose flash is to be removed.

It will be appreciated that the time required to make a single complete revolution of the ring R is quite short, and as the peripheries of the flash-removing means have a definite or fixed relationship to the bottom of the groove 18 that there is no danger of over-cutting or over-abrading the ring in removing the flash.

Various changes may be made in the details of construction without departing from the spirit and scope of the invention as defined by the appended claims.

I claim:

1. A device of the class described including a rotary flash-removing means, means for rotating the flash-removing means, pulley halves at opposite sides of the flash-removing means rotatable about axes coincident with that of the flash-removing means and relatively thereto, said pulley halves being shaped to cooperate to form a grooved pulley adapted to receive a ring from which flash is to be removed and means for training a ring from which the flash is to be removed over the pulley halves so that its flash may be removed by the flash-removing means.

2. A device of the class described including a rotary flash-removing means, means for rotating the flash-removing means, pulley halves at opposite sides of the flash-removing means rotatable about axes coincident with that of the flash-removing means and relatively thereto, said pulley halves being shaped to cooperate to form a grooved pulley adapted to receive a ring from which flash is to be removed, and means for training a ring from which the flash is to be removed over the pulley halves at a linear rate different from the peripheral rate of the flash-removing means.

3. A device of the class described comprising two opposed rotary flash-removing means at least one of which is movable toward and away from the other, means for rotating each of said flash-removing means, each flash-removing means having opposed half pulleys on opposite sides thereof rotatable about axes coincident with the axis of rotation of their respective flash-removing means and relatively thereto, said half pulleys being shaped to cooperate to form a grooved pulley adapted to receive a ring from which flash is to be removed and means for training a ring whose flash is to be removed between the flash-removing means.

4. A device of the class described comprising two opposed rotary flash-removing means at least one of which is movable toward and away from the other, means for rotating each of said flash-removing means, each flash-removing means having opposed half pulleys on opposite sides thereof rotatable about axes coincident with the axis of rotation of their respective flash-removing means and relatively thereto, said half pulleys being shaped to cooperate to form a grooved pulley adapted to receive a ring from which flash is to be removed and means for training a ring whose flash is to be removed between the flash-removing means at a linear speed different from that of the peripheral speed of the flash-removing means.

5. A device of the class described comprising two opposed rotary flash-removing means at least one of which is movable toward and away from the other, means for rotating each of said flash-removing means in the same direction, each flash-removing means having opposed half pulleys on opposite sides thereof rotatable about axes coincident with that of their respective flash-removing means and relatively thereto, said half pulleys being shaped to cooperate to form a grooved pulley adapted to receive a ring from which flash is to be removed and means for training a ring whose flash is to be removed between the flash-producing means and between the opposed half pulleys associated therewith.

6. A device of the class described comprising two opposed rotary flash-removing means at least one of which is movable toward and away from the other, means for rotating each of said flash-removing means in the same direction, each flash-removing means having opposed half pulleys on opposite sides thereof rotatable about axes coincident with that of their respective flash-removing means and relatively thereto at a linear speed different from that of the peripheral speed of the flash-removing means, said half pulleys being shaped to cooperate to form a grooved pulley adapted to receive a ring from which flash is to be removed.

7. A device of the class described comprising a base, a motor on the base, a flash-removing means fixed to the rotor shaft of the motor, half pulleys rotatably mounted on the rotor shaft and flanking the flash-removing means thereon, a second flash-removing means arranged in alignment with the first-mentioned flash-removing means, half pulleys flanking said second flash-removing means, means for driving the second flash-removing means by the motor, a pulley over which a ring whose flash is to be removed can be trained about the first-mentioned flash-removing means, and means for rotating the last-mentioned pulley by the motor.

8. A device of the class described comprising a base, a motor on the base, a flash-removing means fixed to the rotor shaft of the motor, half pulleys rotatably mounted on the rotor shaft and flanking the flash-removing means thereon, said half pulleys being shaped to cooperate to form a grooved pulley adapted to receive a ring from which flash is to be removed, a second flash-removing means arranged in alignment with the first-mentioned flash-removing means, half pulleys flanking said second flash-removing means, the last-mentioned half pulleys being also shaped to cooperate to form a grooved pulley means for driving the second flash-removing means by the motor, a pulley over which a ring whose flashing is to be removed can be trained about the first-mentioned flash-removing means, and means for rotating the last-mentioned pulley by the motor at a reduced speed compared with the speed of rotation of the flash-removing means.

9. A device of the class described comprising a base, a motor on the base, a flash-removing means fixed to the rotor shaft of the motor, half pulleys rotatably mounted on the rotor shaft and flanking the flash-removing means thereon, a second flash-removing means arranged in alignment with the first-mentioned flash-removing means, half pulleys flanking said second flash-removing means, means for driving the second flash-removing means by the motor, a pulley over which a ring whose flash is to be removed can be trained about the first-mentioned flash-removing means, means for rotating the last-mentioned pulley by the motor, the second flash-removing means and the half pulleys associated therewith being movable toward and away from the first flash-removing means, and spring means urging the second flash-removing means toward the first.

References Cited in the file of this patent

UNITED STATES PATENTS

| | | |
|---|---|---|
| 121,963 | Radford | Dec. 19, 1871 |
| 128,388 | Gyles | June 25, 1872 |
| 714,812 | Mann et al. | Dec. 2, 1902 |
| 947,079 | Latcham | Jan. 18, 1910 |
| 1,330,383 | Moore | Feb. 10, 1920 |
| 2,022,257 | Scott | Nov. 26, 1935 |
| 2,432,753 | Griffin | Dec. 16, 1947 |
| 2,521,210 | Fulmer | Sept. 5, 1950 |